(12) United States Patent
Shimura

(10) Patent No.: US 9,920,798 B2
(45) Date of Patent: Mar. 20, 2018

(54) BRAKING DEVICE

(71) Applicant: KABUSHIKI KAISHA SOMIC ISHIKAWA, Tokyo (JP)

(72) Inventor: Ryota Shimura, Tokyo (JP)

(73) Assignee: KABUSHIKI KAISHA SOMIC ISHIKAWA, Tokyo (JP)

( * ) Notice: Subject to any disclaimer, the term of this patent is extended or adjusted under 35 U.S.C. 154(b) by 0 days.

(21) Appl. No.: 15/307,825

(22) PCT Filed: Apr. 23, 2015

(86) PCT No.: PCT/JP2015/062331
§ 371 (c)(1),
(2) Date: Oct. 31, 2016

(87) PCT Pub. No.: WO2015/170595
PCT Pub. Date: Nov. 12, 2015

(65) Prior Publication Data
US 2017/0058973 A1 Mar. 2, 2017

(30) Foreign Application Priority Data

May 9, 2014 (JP) .................................. 2014-097858

(51) Int. Cl.
*B62L 5/00* (2006.01)
*F16D 51/04* (2006.01)
(Continued)

(52) U.S. Cl.
CPC ............ *F16D 51/04* (2013.01); *F16D 51/32* (2013.01); *F16D 51/54* (2013.01); *F16D 65/10* (2013.01);
(Continued)

(58) Field of Classification Search
CPC ...... F16D 41/31; F16D 41/064; F16D 41/073; F16C 41/31; F16C 41/064; F16C 41/073; B60K 17/02
(Continued)

(56) References Cited

U.S. PATENT DOCUMENTS 1,930,711 A * 10/1933 Fishburn ................. B60K 17/02
192/47
1,947,703 A * 2/1934 Fishburn ............... F16D 41/064
192/45.003

(Continued)

FOREIGN PATENT DOCUMENTS

| JP | 2011012750 A | 1/2011 |
| JP | 201477510 A | 5/2014 |
| WO | 2015111458 A1 | 11/2005 |

OTHER PUBLICATIONS

International Search Report of the Japanese Patent Office dated Jun. 30, 2015—Translation.

*Primary Examiner* — Christopher P Schwartz
(74) *Attorney, Agent, or Firm* — PatShegen IP

(57) ABSTRACT

To provide a braking device that achieves unidirectionality without limiting the direction of rotation of a rotor. The present invention is characterized by being equipped with a housing (10), a rotor (20) provided inside the housing (10), brake shoes (30) provided between the rotor (20) and the housing (10), first protruding parts (40) that move together with the brake shoes (30), and second protruding parts (50) that move in conjunction with the rotation of the rotor (20), with the first protruding parts (40) riding up on the second protruding parts only when the rotor (20) rotates in the normal direction, and thereby generating greater friction between the brake shoes (30) and the housing (10) than the
(Continued)

friction that can be generated between the brake shoes (30) and the housing (10) when the rotor (20) rotates in the reverse direction.

8 Claims, 4 Drawing Sheets

(51) Int. Cl.
  *F16D 65/22* (2006.01)
  *F16D 51/32* (2006.01)
  *F16D 51/54* (2006.01)
  *F16D 65/10* (2006.01)
  *F16D 125/66* (2012.01)
  *F16D 125/36* (2012.01)

(52) U.S. Cl.
  CPC .......... *F16D 65/22* (2013.01); *F16D 2125/36* (2013.01); *F16D 2125/66* (2013.01)

(58) Field of Classification Search
  USPC .............. 188/24.11, 24.12, 24.14, 82.84, 26; 192/45.02, 103 B, 109 R, 47
  See application file for complete search history.

(56) References Cited

U.S. PATENT DOCUMENTS

| | | | | |
|---|---|---|---|---|
| 2,391,350 | A * | 12/1945 | Schmidt | F16D 41/073 188/82.84 |
| 2,685,944 | A * | 8/1954 | Faucher | F16D 63/00 188/74 |
| 2,858,675 | A * | 11/1958 | Schneider | F16H 61/60 188/296 |
| 5,421,435 | A * | 6/1995 | Hanada | B62L 5/00 188/24.14 |
| 5,579,879 | A * | 12/1996 | Hasegawa | F16D 41/064 192/109 R |
| 5,595,273 | A * | 1/1997 | Endoy | F16D 41/064 192/103 B |
| 5,988,325 | A * | 11/1999 | Matsueda | B62L 5/10 188/24.11 |
| 6,290,028 | B1* | 9/2001 | Liu | B62L 5/00 188/24.14 |
| 6,502,679 | B1* | 1/2003 | Wang | F16D 41/30 192/45.02 |
| 2005/0189189 | A1 | 9/2005 | Acosta | |

* cited by examiner

BRAKING DEVICE

TECHNICAL FIELD

The present invention relates to a braking device and, in more detail, relates to a device that stops or decelerates an object in motion, with friction.

BACKGROUND ART

Conventionally, a device that stops or decelerates an object in motion with friction, has been known. For example, JP 2011-012750 A discloses a braking device including a bearing including a frictional material, a shaft inserted into the bearing, and a unidirectional clutch that rotates the shaft only in one direction. The device generates friction between the shaft and the bearing upon normal rotation of the shaft. However, this is a configuration in which the friction between the shaft and the bearing also occurs upon reverse rotation of the shaft. Therefore, the device prevents the reverse rotation of the shaft, with the unidirectional clutch. According to the device, only when an object to be controlled (hereinafter, the object to be controlled is simply referred to as an "object") rotates in the one direction, motion of the object can be stopped or decelerated. Performance in which motion of an object can be stopped or decelerated only when the object rotates in one direction, is referred to as "unidirectionality", below.

However, the unidirectional clutch is required in order to regulate a rotational direction of the shaft in the conventional technique. Therefore, the amount of assembly man-hours inevitably also increases because of a large number of components. As a result, there is a problem that manufacturing costs are high. In addition, dimensional accuracy of the shaft to be integrated with the unidirectional clutch is high, and hardness of a surface of the shaft is required. Thus, there is a problem that processing costs of the shaft are high. Furthermore, there is a problem that providing the unidirectional clutch results in an increase of the device in size.

CITATION LIST

Patent Literature

Patent Literature 1: JP 2011-012750 A

SUMMARY OF INVENTION

Technical Problem

An object of the present invention is to provide a braking device capable of achieving unidirectionality without regulating a rotational direction of a rotor.

Solution to Problem

In order to solve the above problem, the present invention provides a braking device including: a housing; a rotor provided inside the housing; a brake shoe provided between the rotor and the housing; a first protruding part configured to move together with the brake shoe; and a second protruding part configured to move in association with rotation of the rotor. The first protruding part gets on the second protruding part only when the rotor is in normal rotation such that friction larger than friction occurring between the brake shoe and the housing when the rotor is in reverse rotation, occurs between the brake shoe and the housing.

Advantageous Effects of Invention

The present invention provides a configuration in which the first protruding part gets on the second protruding part only when the rotor is in normal rotation such that friction larger than friction occurring between the brake shoe and the housing when the rotor is in reverse rotation, occurs between the brake shoe and the housing. Therefore, according to the present invention, the unidirectionality can be achieved without the rotational direction of the rotor regulated. In addition, the present invention requires no unidirectional clutch so as to be able to solve all various problems caused by providing the unidirectional clutch.

DESCRIPTION OF EMBODIMENTS

Embodiments of the present invention will be more specifically described below based on examples according to the present invention. However, the technical scope of the present invention is not limited to the detailed descriptions below.

Example 1

Figure 1:
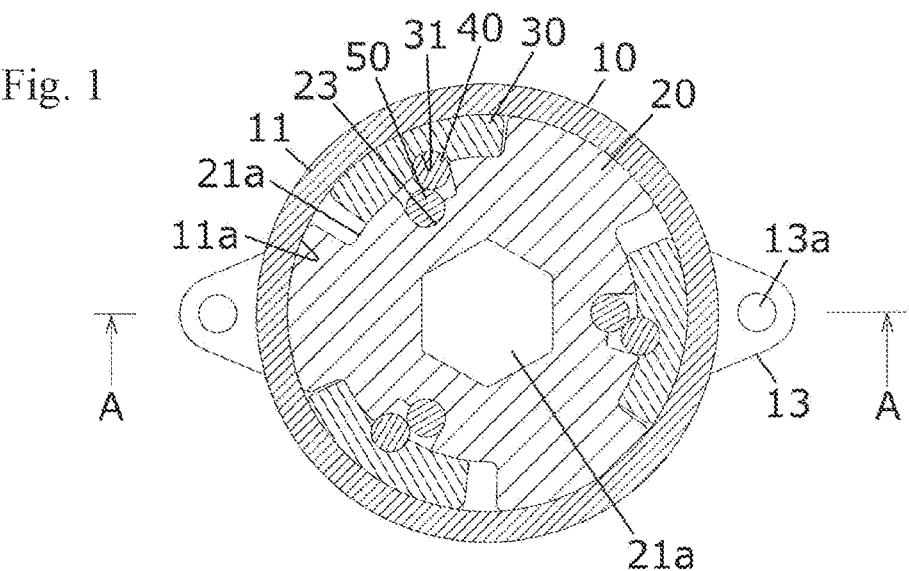
FIG. 1 is a sectional view of a braking device according to Example 1.

As illustrated in FIG. 1, a braking device according to Example 1 includes a housing 10, a rotor 20, brake shoes 30, first protruding parts 40, and second protruding parts 50.

Figure 2:
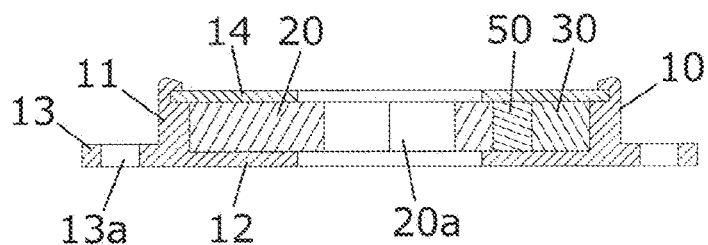
FIG. 2 is a sectional view taken along line A-A of FIG. 1.

The housing 10 includes a peripheral wall 11, a bottom wall 12, flanges 13, and a lid 14. As illustrated in FIG. 1, the peripheral wall 11 has a cylindrical shape. As illustrated in FIG. 2, the bottom wall 12 is integrally formed with the peripheral wall 11 so as to blockade the side of a lower end of the peripheral wall 11. As illustrated in FIG. 2, the flanges 13 are integrally formed with the peripheral wall 11 so as to protrude from the peripheral wall 11 to the outside. As illustrated in FIG. 2, the lid 14 is integrated with the peripheral wall 11 so as to blockade the side of an upper end of the peripheral wall 11. The housing 10 is fixed so as to be used. Bolts for fixing the housing 10 are individually inserted into holes 13a formed through the flanges 13.

As illustrated in FIGS. 1 and 2, the rotor 20 is provided to the inside of the housing 10. The rotor 20 is coupled to a shaft that operates together with motion of an object and rotates (not illustrated, hereinafter, the shaft is simply referred to as the "shaft of the object") so as to be used. The rotor 20 has a hole 20*a* with which the shaft of the object combines. The rotor 20 combined with the shaft of the object performs normal rotation in the housing 10 when the object moves in one direction (rotation in a clockwise direction in FIG. 1). The rotor 20 performs reverse rotation in the housing 10 when the object moves in the reverse direction (rotation in a counterclockwise direction in FIG. 1).

Figure 3:
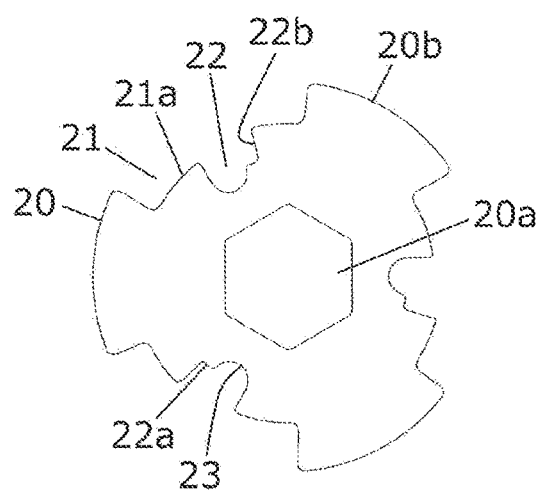
FIG. 3 is a plan view of a rotor.

As illustrated in FIG. 3, the rotor 20 includes first grooves 21 and second grooves 22. The first grooves 21 have predetermined depths from an outer circumferential surface 20*b* of the rotor 20. The second grooves 22 have predetermined depths from bottoms 21*a* of the first grooves 21. The "depths" described here correspond to lengths in a diameter direction. Semicircular grooves 23 are formed in bottoms 22*a* of the second grooves 22.

As illustrated in FIG. 1, the brake shoes 30 are provided between the rotor 20 and the housing 10. The brake shoes 30 are formed of rubber or elastomer. The brake shoes 30 arranged in the first grooves 21 formed on the rotor 20 are formed so as to include shapes having outer surfaces abutting on an inner surface 11*a* of the peripheral wall 11 of the housing 10, and inner surfaces abutting on the bottoms 21*a* of the first grooves 21.

One brake shoe 30 is at least provided at one position. However, that type of configuration has a risk that partial wear of the one brake shoe 30 occurs. Therefore, brake shoes 30 are preferably arranged at a plurality of positions at regular intervals. Partial wear barely occurs in a configuration including two brake shoes 30 arranged at two positions at regular intervals, in comparison to the configuration including the one brake shoe 30 arranged at the one position. However, there is still a risk that the partial wear occurs. Therefore, three brake shoes 30 are most preferably arranged at at least three positions at regular intervals. According to the present example, as illustrated in FIG. 1, the brake shoes 30 are arranged at three positions mutually at an interval of 120°. With this configuration, partial wear of the brake shoes 30 can be prevented.

As illustrated in FIG. 1, the first protruding parts 40 are provided so as to move together with the brake shoes 30. The first protruding parts 40 may be integrally formed with the brake shoes 30. However, in a case where the first protruding parts 40 are incapable of rotating, the first protruding parts 40 are easily worn due to friction between the first protruding parts 40 and the second protruding parts 50. Therefore, preferably, the first protruding parts 40 are independent of the brake shoes 30, and are capable of rotating.

As illustrated in FIG. 1, the second protruding parts 50 are provided so as to move in association with rotation of the rotor 20. The second protruding parts 50 may be integrally formed with the rotor 20. However, in a case where the second protruding parts 50 are incapable of rotating, the second protruding parts 50 are easily worn due to the friction between the first protruding parts 40 and the second protruding parts 50. Therefore, preferably, the second protruding parts 50 are independent of the rotor 20, and are capable of rotating.

The first protruding parts 40 and the second protruding parts 50 are preferably selected from parallel pins and steel balls in consideration of easy rotation and wear resistance. However, in a case where one or both of a first protruding part 40 and a second protruding part 50 are steel balls, since an area with which mutually coming in contact is small, wear easily occurs in comparison to a case where both are parallel pins. In a case where the parallel pins come in contact with each other, since an area with which mutually coming in contact is large, wear barely occurs. Therefore, the first protruding parts 40 and the second protruding parts 50 both are preferably parallel pins.

The first protruding parts 40 adopted in the present example are the parallel pins, and fit into semicircular grooves 31 formed on inner surfaces of the brake shoes 30. As illustrated in FIG. 1, parts of the first protruding parts 40, protruding from the brake shoes 30 are arranged in the second grooves 22. The second protruding parts 50 adopted in the present example are also parallel pins. As illustrated in FIG. 1, the second protruding parts 50 fit into the grooves 23 formed in the bottoms 22*a* of the second grooves 22.

The first protruding parts 40 are preferably in contact with the second protruding parts 50 at all times. This is because a configuration in which a state where the first protruding parts 40 and the second protruding parts 50 are in no contact with each other, is present, requires time for the second protruding parts 50 to come in contact with the first protruding parts 40 when the rotor 20 is in normal rotation, and responsiveness degrades. In addition, collision sounds occur when the first protruding parts 40 and the second protruding parts 50 come in contact with each other. When the first protruding parts 40 and the second protruding parts 50 remain in continually contact with each other, the responsiveness is satisfactory. The occurrence of the collision sounds can be also prevented.

The braking device including the above configuration operates as follows: That is, when the rotor 20 performs the normal rotation, the second protruding parts 50 move in the clockwise direction in FIG. 1 in association with the rotation of the rotor 20 (hereinafter, this direction is referred to as a "braking direction"). In this case, the outer surfaces of the brake shoes 30 come in surface contact with the inner surface 11*a* of the peripheral wall 11 of the housing 10. Thus, the brake shoes 30 do not move in the braking direction simultaneously with starting of the rotor 20 so that the first protruding parts 40 get on the second protruding parts 50. The brake shoes 30 are compressed between the first protruding parts 40 and the peripheral wall 11 so as to be deformed. As a result, the brake shoes 30 move in the braking direction, thrusting the inner surface 11*a* of the peripheral wall 11 with elastic force of the brake shoes 30. Thus, friction that stops or decelerates the motion of the object, occurs between the brake shoes 30 and the housing 10.

Figure 4:
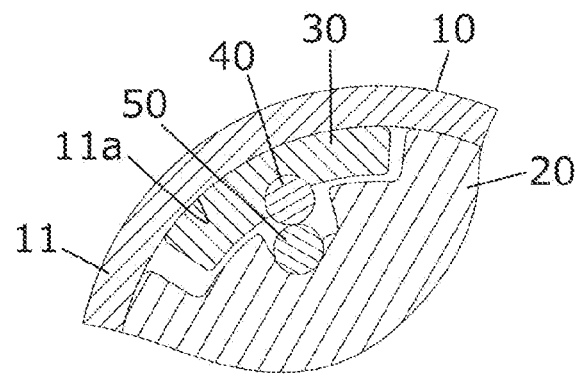
FIG. 4 is a partially sectional view for describing operation of the braking device.
Figure 5:
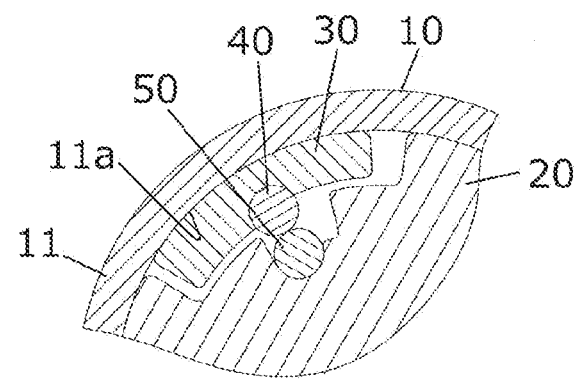
FIG. 5 is another partially sectional view for describing the operation of the braking device.

When the rotor 20 is in the normal rotation, the degree of causing the first protruding parts 40 to get on the second protruding parts 50 is proportional to rotating force of the rotor 20. Thus, the magnitude of the friction occurring between the brake shoes 30 and the housing 10 varies in proportion to the rotating force of the rotor 20. That is, when the rotating force of the rotor 20 is small, as illustrated in FIG. 4, the first protruding parts 40 slightly get on the second protruding parts 50 (the degree of getting-on is low) so that the elastic force of the brake shoes 30 also decreases. Therefore, the friction occurring between the brake shoes 30 and the housing 10, is small. Meanwhile, when the rotating force of the rotor 20 is large, as illustrated in FIG. 5, the first protruding parts 40 considerably get on the second protruding parts 50 (the degree of getting-on is high) so that the elastic force of the brake shoes 30 is made to be large. Therefore, the friction occurring between the brake shoes 30 and the housing 10 is large.

Figure 6:
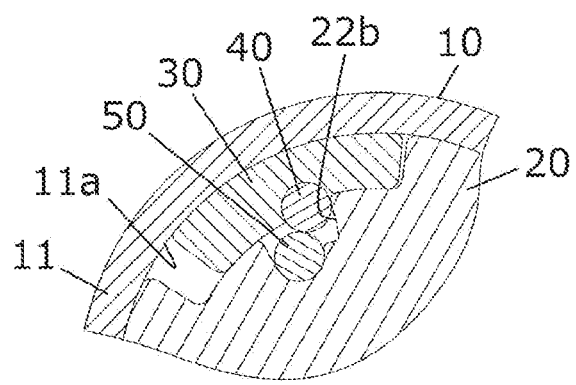
FIG. 6 is another partially sectional view for describing the operation of the braking device.

When the rotor 20 performs the reverse rotation, side wall surfaces 22*b* of the second grooves 22 formed on the rotor 20 thrust the first protruding parts 40 in the counterclockwise direction in FIG. 1 (hereinafter, the direction is referred to as a "non-braking direction). However, in this case, the second protruding parts 50 move in the non-braking direction in association with the rotation of the rotor 20 so that the first protruding parts 40 do not get on the second protruding parts 50 as illustrated in FIG. 6. Therefore, no elastic force of the brake shoes 30 occurs so that a degree of friction that stops or decelerates the motion of the object, does not occurs between the brake shoes 30 and the housing 10.

As described above, the braking device according to the present example includes the configuration in which the first protruding parts 40 get on the second protruding parts 50 only when the rotor 20 is in the normal rotation so that friction larger than the friction that can occur between the brake shoes 30 and the housing 10 when the rotor 20 is in the reverse rotation, occurs between the brake shoes 30 and the housing 10. Therefore, according to the braking device, unidirectionality can be achieved without the rotational direction of the rotor 20 regulated. The braking device also requires no unidirectional clutch so that the number of components is remarkably small. Therefore, there is an advantage that the amount of assembly man-hours is remarkably small and manufacturing costs are low. The braking device also has a simple configuration and requires no unidirectional clutch so that miniaturization of the device can be achieved.

Example 2

Figure 7:
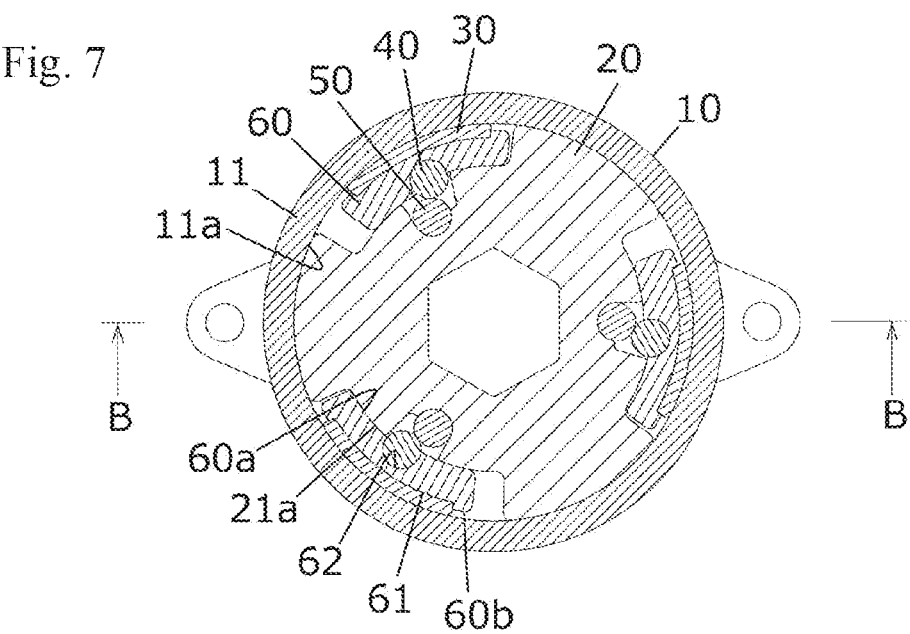
FIG. 7 is a sectional view of a braking device according to Example 2.
Figure 8:
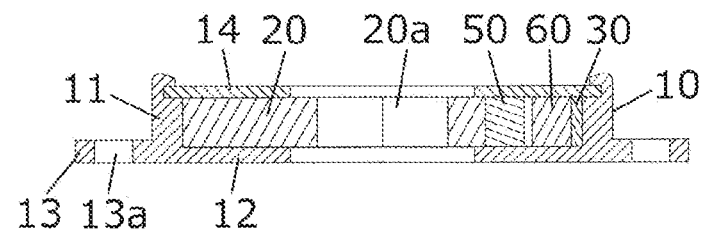
FIG. 8 is a sectional view taken along line B-B of FIG. 7.

As illustrated in FIGS. 7 and 8, a braking device according to Example 2 further includes supporting members 60 for supporting brake shoes 30, differently from the braking device according to Example 1.

The supporting members 60 are provided between a rotor 20 and the brake shoes 30. Inner surfaces 60a of the supporting members 60 are in contact with bottoms 21a of first grooves 21 formed on the rotor 20. Before starting of the rotor 20, gaps between outer surfaces 60b of the supporting members 60 and an inner surface 11a of a peripheral wall 11 of a housing 10, are formed. Grooves 61 on which the brake shoes 30 are mounted are formed on the outer surfaces 60b of the supporting members 60. Grooves 62 into which first protruding parts 40 fit are formed on the inner surfaces 60a of the supporting members 60. The supporting members 60 are formed of a material that barely deforms in comparison to the brake shoes 30, such as rubber, elastomer, or metal, having elasticity lower than that of the brake shoes 30.

Figure 10:
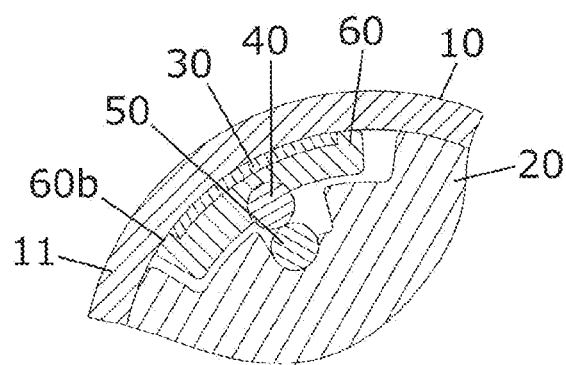
FIG. 10 is another partially sectional view for describing the operation of the braking device.

The supporting members 60 have a function for preventing the first protruding parts 40 from getting over second protruding parts 50. That is, when a situation in which the first protruding parts 40 that have got on the second protruding parts 50 get over the second protruding parts 50 due to rotating force exceeding a normal range of the rotor 20, occurs, braking force due to friction no longer occurs. Thus, there is a need to prevent this. As illustrated in FIG. 10, the outer surfaces 60b of the supporting members 60 abut on the peripheral wall 11 of the housing 10 so that the brake shoes 30 are inhibited from further deforming even in a case where the first protruding parts 40 are about to get over the second protruding parts 50 due to the rotating force exceeding the normal range of the rotor 20 when the rotor 20 is in normal rotation. Thus, the braking device according to the present example, can effectively prevent the first protruding parts 40 from getting over the second protruding parts 50.

Figure 9:
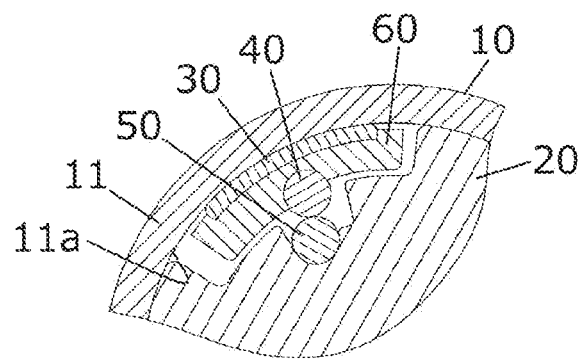
FIG. 9 is a partially sectional view for describing operation of the braking device.

The braking device according to the present example, operates, similarly to the braking device according to Example 1, in a case where the rotating force of the rotor 20 remain in the normal range. That is, when the rotor 20 performs the normal rotation, the second protruding parts 50 move in a braking direction in association with rotation of the rotor 20. In this case, outer surfaces of the brake shoes 30 come in surface contact with the inner surface 11a of the peripheral wall 11 of the housing 10. Accordingly, the brake shoes 30 do not move in the braking direction simultaneously with the starting of the rotor 20 so that the first protruding parts 40 get on the second protruding parts 50 as illustrated in FIG. 9. The brake shoes 30 are compressed between the supporting members 60 and the peripheral wall 11 so as to deform. As a result, the brake shoes 30 move in the braking direction, thrusting the inner surface 11a of the peripheral wall 11 due to elastic force of the brake shoes 30. Thus, friction that stops or decelerates motion of an object, occurs between the brake shoes 30 and the housing 10.

Figure 11:
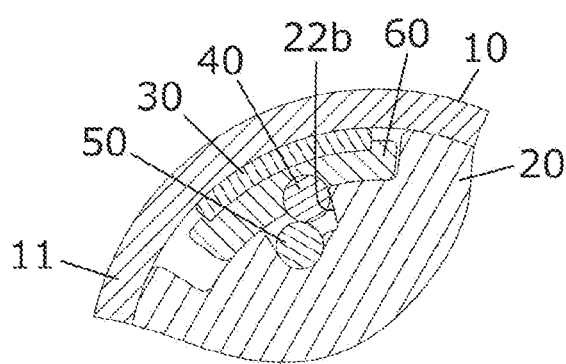
FIG. 11 is another partially sectional view for describing the operation of the braking device.

Meanwhile, when the rotor 20 performs reverse rotation, side wall surfaces 22b of second grooves 22 formed on the rotor 20 thrust the first protruding parts 40 in a non-braking direction. However, in this case, the second protruding parts 50 move in the non-braking direction in association with the rotation of the rotor 20 so that the first protruding parts 40 do not get on the second protruding parts 50 as illustrated in FIG. 11. Therefore, no elastic force of the brake shoes 30 occurs so that a degree of friction that stops or decelerates the motion of the object, does not occurs between the brake shoes 30 and the housing 10.

As described above, the braking device according to the present example includes the configuration in which the first protruding parts 40 get on the second protruding parts 50 only when the rotor 20 is in the normal rotation so that friction larger than the friction that can occur between the brake shoes 30 and the housing 10 when the rotor 20 is in the reverse rotation, occurs between the brake shoes 30 and the housing 10. Therefore, according to the braking device, unidirectionality can be achieved without the rotational direction of the rotor 20 regulated. The braking device requires no unidirectional clutch, similarly to the braking device according to Example 1, so that the number of components is remarkably small. Therefore, there is an advantage that the amount of assembly man-hours is remarkably small and manufacturing costs are low. The braking device also has a simple configuration and requires no unidirectional clutch so that miniaturization of the device can be achieved.

REFERENCING LIST 10 housing
11 peripheral wall
11a inner surface of the peripheral wall
12 bottom wall
13 flange
13a hole
14 lid
20 rotor
20a hole
20b outer circumferential surface of the rotor
21 first groove
21a bottom of the first groove
22 second groove
22a bottom of the second groove
22b side wall surface of the second groove
23 groove
30 brake shoe
31 groove 40 first protruding part
50 second protruding part
60 supporting member
60a inner surface of the supporting member
60b outer surface of the supporting member
61 groove
62 groove

The invention claimed is:

1. A braking device comprising:
   a housing;
   a rotor provided inside the housing;
   a brake shoe provided between the rotor and the housing;
   a first protruding part configured to move together with the brake shoe; and
   a second protruding part configured to move in association with rotation of the rotor,
   wherein the first protruding part is pushed up by a moving of the second protruding part only when the rotor is in normal rotation such that friction larger than friction occurring between the brake shoe and the housing when the rotor is in reverse rotation, occurs between the brake shoe and the housing.

2. The braking device according to claim 1, wherein magnitude of the friction occurring between the brake shoe and the housing when the rotor is in the normal rotation, varies in proportion to rotating force of the rotor.

3. The braking device according to claim 1, further comprising: a supporting member supporting the brake shoe, the supporting member configured to prevent the first protruding part from getting over the second protruding part.

4. The braking device according to claim 1, wherein the rotor includes a first groove having a predetermined depth from an outer circumferential surface of the rotor, and a second groove having a predetermined depth from a bottom of the first groove, the brake shoe is arranged in the first groove, and the first protruding part is arranged in the second groove.

5. The braking device according to claim 1, wherein the first protruding part is in contact with the second protruding part at all times.

6. The braking device according to claim 1, wherein the brake shoe is arranged at a plurality of positions at regular intervals.

7. The braking device according to claim 6, wherein the brake shoe is arranged at at least three positions.

8. The braking device according to claim 1, wherein the first protruding part and the second protruding part are rotatable.

* * * * *